US011953326B2

(12) United States Patent
Nachstedt et al.

(10) Patent No.: US 11,953,326 B2
(45) Date of Patent: Apr. 9, 2024

(54) OPTIMIZED SUBDIVISION OF DIGITAL MAPS INTO MAP SECTIONS

(71) Applicant: Robert Bosch GmbH, Stuttgart (DE)

(72) Inventors: Timo Nachstedt, Benningen (DE); Carsten Hasberg, Ilsfeld-Auenstein (DE); Ross Kidson, Tarp (DE)

(73) Assignee: ROBERT BOSCH GMBH, Stuttgart (DE)

(*) Notice: Subject to any disclaimer, the term of this patent is extended or adjusted under 35 U.S.C. 154(b) by 1 day.

(21) Appl. No.: 17/108,777

(22) Filed: Dec. 1, 2020

(65) Prior Publication Data
US 2021/0180962 A1  Jun. 17, 2021

(30) Foreign Application Priority Data
Dec. 11, 2019 (DE) .......................... 102019219354.4

(51) Int. Cl.
*G01C 21/32* (2006.01)
*B60W 60/00* (2020.01)
*G01C 21/36* (2006.01)

(52) U.S. Cl.
CPC .......... *G01C 21/32* (2013.01); *B60W 60/001* (2020.02); *G01C 21/3614* (2013.01)

(58) Field of Classification Search
CPC ............... G01C 21/32; G01C 21/3614; G01C 21/3848; G01C 21/3867; G01C 21/3874; G01C 21/3841; B60W 60/001
See application file for complete search history.

(56) References Cited

U.S. PATENT DOCUMENTS

| 2005/0052472 | A1* | 3/2005 | Hashizume | G01C 21/3647 345/660 |
| 2017/0177950 | A1* | 6/2017 | Hasberg | G01C 21/3815 |
| 2018/0216942 | A1* | 8/2018 | Wang | G01S 7/4808 |
| 2018/0225835 | A1* | 8/2018 | Harada | G01C 21/34 |
| 2020/0318977 | A1* | 10/2020 | Jo | G01C 21/3881 |
| 2021/0300379 | A1* | 9/2021 | Hackeloeer | B60W 30/18154 |

FOREIGN PATENT DOCUMENTS

| DE | 102015225472 A1 | 6/2017 | |
| DE | 102017122440 A1 | 3/2019 | |
| DE | 102017218397 A1 | 4/2019 | |
| WO | WO-2019072524 A1 * | 4/2019 | G01C 21/32 |

OTHER PUBLICATIONS

Translation of WO 2019072524 A1 (Year: 2019).*

* cited by examiner

*Primary Examiner* — Kenneth J Malkowski
*Assistant Examiner* — Ibrahim Abdoalatif Alsomairy
(74) *Attorney, Agent, or Firm* — NORTON ROSE FULBRIGHT US LLP; Gerard A. Messina (57) ABSTRACT

A method for certifying map elements for safety-critical driving functions by a control unit, at least one observation variable of at least one mapping step being ascertained by at least one map element after an implementation of the mapping step by a monitoring function, and being compared with a setpoint value of the observation variable, at least one result value being calculated based on a comparison of the observation variable with the setpoint value of the observation variable for the at least one mapping step by the monitoring function, the at least one result value being stored as a certificate and being linked with the at least one map element. A control unit, a computer program as well as a machine-readable memory medium are also described.

13 Claims, 5 Drawing Sheets

OPTIMIZED SUBDIVISION OF DIGITAL MAPS INTO MAP SECTIONS

CROSS REFERENCE

The present application claims the benefit under 35 U.S.C. § 119 of German Patent Application No. DE 102019219354.4 filed on Dec. 11, 2019, which is expressly incorporated herein by reference in its entirety.

FIELD

The present invention relates to a method for creating a digital map, to a control unit, to a computer program, and to a machine-readable memory medium.

BACKGROUND INFORMATION

Automated driving functions and vehicles including automated driving functions are becoming increasingly important. Updated and precise maps are essential for a successful implementation of automated driving functions.

The use of digital maps for automated driving functions enables vehicles to compensate for limited sensor ranges and obscured scanning areas of the sensors and facilitates a complete surroundings perception.

In addition, digital maps outside vehicle surroundings may be created with a normally higher computing power, as a result of which it is possible to process and to provide more complex processing algorithms and a larger volume of data. The utilization of the maps by an onboard control unit requires a lower computing power than the vehicle-external creation of the maps.

To use digital maps in automated driving functions, a digital map is normally subdivided into smaller map tiles. The digital map in this case is divided into a grid including identical map tiles. The problem with this subdivision of the digital map is the uncontrolled demarcation of the borders of the map tiles. As a result, road courses may be divided at unsuitable locations such as, for example, intersections, as a result of which multiple map tiles are necessary for such a navigation. This increases the computing time and the required volume of data when updating, using and retrieving the digital map.

SUMMARY

An object of the present invention includes providing a method for such a partition of digital maps in a way that reduces a computing time and the volume of data to be processed when handling the digital map.

This object may be achieved in accordance with example embodiments of the present invention. Advantageous embodiments of the present invention are described herein.

According to one aspect of the present invention, a method is provided for creating a digital map. The method may be carried out by a control unit.

In accordance with an example embodiment of the present invention, in one step, measured data of at least one sensor are received from at least one mapping vehicle.

Based on the received measured data, positions and orientations of the mapping vehicle are ascertained via a SLAM method. The mapping may, for example, take place using a graph-SLAM method, which is configured to explicitly model vehicle position and vehicle orientations.

The measured data received from mapping vehicles may be pre-processed. The measured data received from different mapping vehicles are subsequently geometrically aligned. The alignment may take place with the aid of static landmarks and features, which are locatable by the control unit in different measured data sets. Once the measured data are aligned by the control unit, the position of the static landmarks and also the poses of the mapping vehicle may be ascertained. The poses of the mapping vehicles in this case include the positions and orientation of the mapping vehicles during different points in time.

The digital map is generated on the basis of the received measured data, the positions and orientations of the mapping vehicle. Localization maps may, for example, be created from the landmarks. The trajectory driven by the mapping vehicles may be derived from the sequence of the mapping vehicle poses. In addition to the analysis of the trajectories, the landmarks may be further processed by the control unit to form planning maps.

Data of a road course may be ascertained based on the trajectories of the mapping vehicles, which were based on the temporal course of the poses of the mapping vehicles.

Alternatively or in addition, the data of the road course may be received from a database. The database may be a database integrated into the control unit or an external database, which the control unit is able to access in a data-conducting manner.

In one further step, the digital map is subdivided into at least two map sections, which form at least a part of the digital map. By subdividing the digital map into multiple map sections, it is possible to lower the volume of data to be received and to be processed.

According to an example embodiment of the present invention, the map sections are created along the road course, the map sections including pieces of connection information related to one another that correspond to the road course.

The pieces of connection information of the map sections may preferably correspond to a course of traffic lanes of the road course, so that, for example, map sections mapping intersections and map sections mapping tunnels are clearly distinguishable from one another.

By dividing the digital map into map sections, which follow a geometric course of roads, it is possible to carry out an optimized initial mapping. The borders of the map sections need not necessarily extend in a straight line. In this way, it is possible to situate two adjacent map sections in such a way that a fragmentation of roads by the number of map sections used is minimized.

For example, the method may prevent the borders of map sections from crossing an intersection of the road course or from extending along the middle of a road.

In addition, the borders of all map sections are known and created based on the structure of the road course. Such an explicit handling of the map sections enables a precise and consistent orientation of the map sections. Ambiguities in the creation of map sections, which extend across multiple height levels such as, for example, parking garages, overpasses and underpasses, may also be avoided, since the pieces of connection information of the map sections enable a linking along different height levels.

When carrying out an update, it is possible to minimize the number of map sections required. Since all map sections that include the road course must be updated and a disadvantageous division of the road course along the longitudinal direction is prohibited, it is possible to lower the volume of data required and to particularly rapidly carry out the updating process. Similarly, the volume of data used may be reduced by vehicles, which obtain the map sections for navigation tasks from the control unit. Adjacent map sections, which are designed without road courses, are not required and are thus not transmitted.

The control unit may provide the map sections of the digital map to requesting vehicles via a communication link. The communication link may, for example, be based on a transmission standard such as WLAN, UMTS, GSM, LTE, 5G and the like.

In one advantageous embodiment of the present invention, different map sections may be created and provided for different driving directions along the road course. In this way, it is possible to avoid disadvantageous orientations and shadowings of features during the mapping. Features that are visible from only one direction may, in particular, be stored and provided specifically in the corresponding direction-dependent map sections.

According to one further aspect of the present invention, a control unit is provided, the control unit being configured to carry out the method. The control unit may, for example, be an onboard control unit, a vehicle-external control unit or vehicle-external server unit such as, for example, a cloud system.

Moreover, according to one aspect of the present invention, a computer program is also provided including commands which, when the computer program is executed by a computer or a control unit, prompt the computer to carry out the method according to the present invention. According to one further aspect of the present invention, a machine-readable memory medium is provided, on which the computer program according to the present invention is stored.

The vehicle may be operable according to the BASt standard in an assisted, semi-automated, highly-automated and/or fully-automated or driverless manner.

The vehicle may, for example, be a passenger car, a truck, a robotaxi and the like. The vehicle is not limited to an operation on roads. Instead, the vehicle may also be designed as a watercraft, [or] aircraft such as, for example, a transport drone, and the like.

The map sections preferably include pieces of connection information relating to their adjacent map sections. The pieces of connection information may map a navigable path or the navigable road course, which leads from one map section to an adjacent map section.

The pieces of connection information thus represent the road course through the map sections.

The pieces of connection information may thus be used in a technically simple and rapid manner to find a horizon of potential map sections, which are accessible from a particular location in the road network. The pieces of connection information may thus be used also by mapping algorithms for ascertaining the map sections required for a planned trajectory. Additional search algorithms may thus be omitted.

According to one exemplary embodiment of the present invention, the map sections are created with an equal or unequal shape, size, position within the digital map and/or within an angle orientation relative to one another, the map sections being designed bordering one another and/or overlapping one another. The map sections may, in particular, overlap in sections or completely and thus form two different planes, for example, which are retrievable as a function of the driving direction or planning direction.

The map sections may, in particular, have different sizes, shapes, areas, orientations and the like, in contrast to a regular map grid that includes map tiles. Moreover, the entire area of the digital map need not be covered by the at least two map sections, which reduces the memory requirement for the received map sections.

The map sections map a finite area of the digital map or are designed as parts of the digital map that include a finite area. The map sections in this case contain the pieces of map information of the digital map corresponding to the arrangement of the map sections on the digital map.

Multiple map sections may be superposed on one another multiple times, may be bordering on one another or spaced apart from one another.

Examples for the use of overlapping or superposed map sections may be illustrated by overlaps or undercuts or by tunnels in the road course. Parking garages having multiple levels may also be digitally rendered by multiple superposed map sections. The connection ramps of the levels of the parking garage may be precisely implemented by the pieces of connection information.

By using multiple overlapping or superposed map sections, it is possible to also digitally map and to utilize for the purpose of navigation tasks complex traffic situations and road courses across multiple height levels without ambiguities.

The pieces of connection information of the map sections may deviate from one another and need not necessarily link two or more map sections to one another.

The pieces of connection information preferably provide information about how a road course of a first map section extends beyond the first map section.

For example, the road course of the first map section may lead to a second map section and to a parallel third map section based on a junction of the road course. The pieces of connection information of the first map section may therefore include links to the second and to the third map section.

According to one further specific embodiment of the present invention, the map sections are created with center points, the center points of the map sections being formed along the road course. With the aid of this measure, it is possible to create and align the map section centered along the road course. A centerline of the road course preferably forms a parameter for centering the map sections. In this way, each map section may include a preferably large portion of the road course, which reduces the number of necessary map sections.

According to one further exemplary embodiment of the present invention, the map sections are created with geographical coordinates, which define the borders of the map sections. For example, the geographical coordinates of corner points or intermediate points of the borders that define the map sections may be stored with the local pieces of map information of the respective map sections. For this purpose, one file or one file section of the digital map per map section may be used.

The geographical coordinates may, for example, be formed as degrees of longitude and degrees of latitude.

With the aid of the precise course of the borders of the map sections, it is possible to ascertain in a technically simple manner whether a vehicle is located within a map section or has already left this section.

The geographical coordinates are not limited to the use of rectangular or square-shaped map sections. The map sections may also be shaped as a triangle, a regular polygon and/or as an irregular polygon. Differently shaped map sections may, in particular, be used within a digital map.

The shape and the size such as, for example, the area of the map sections or of one map section may be adapted to a shape of the road course.

In one further specific embodiment of the present invention, at least one trajectory and/or one width of the road course through at least one map section is/are stored in the respective map section. With the aid of this measure, it is possible to store relevant properties and the shape of the road course in the respective map section.

The borders of the map sections enable an approximate localization of a vehicle on the digital map via assignment to a map section. Using the pieces of information and properties of the road course of a map section, it is possible to implement a more exact localization of the vehicle on a road or on a lane of the road course.

According to one further exemplary embodiment of the present invention, at least one driving direction and/or lane count of the road course through at least one map section is stored in the respective map section. For example, a set of map sections may be created for each lane in order to enable a direction-dependent mapping of the landmarks.

The provision of pieces of connection information in opposite directions may therefore be omitted. It is possible with the aid of such a method to use a localization algorithm in a particularly efficient and error-free manner, since erroneous assignments of the lanes in map sections created as a function of the driving direction are ruled out.

According to one further specific embodiment of the present invention, the pieces of connection information of the map sections are stored in the respective map section as a function of the road course and of at least one driving direction along the road course.

In one further embodiment of the present invention, at least one map section is created as a function of a driving direction along the road course.

In this way, the map sections and the corresponding pieces of connection information may be created unidirectionally or as a function of the respective driving direction along the road course. In this way, the scanning area of the sensors used for mapping may be optimally utilized.

Thus, only those map sections may preferably also be called up for a navigation, which are located in the driving direction ahead of the requesting vehicle. Map sections may be preferably pre-loaded, which are accessible by continuing the drive along the road course.

According to one further exemplary embodiment of the present invention, the at least two map sections are created with stored pieces of meta-information. With the aid of this measure, it is possible to assign additional pieces of information to the map sections. The map sections are subject to frequent updates, as a result of which the storing of additional pieces of information away from the so-called graph map plane is advantageous. The pieces of meta-information may, for example, include a date of creation, a date of update, pieces of information relating to the creation algorithm, creation parameters and the like.

BRIEF DESCRIPTION OF THE DRAWINGS

Preferred exemplary embodiments of the present invention are explained in greater detail below with reference to highly simplified schematic representations.

DETAILED DESCRIPTION OF EXAMPLE EMBODIMENTS

Figure 1:
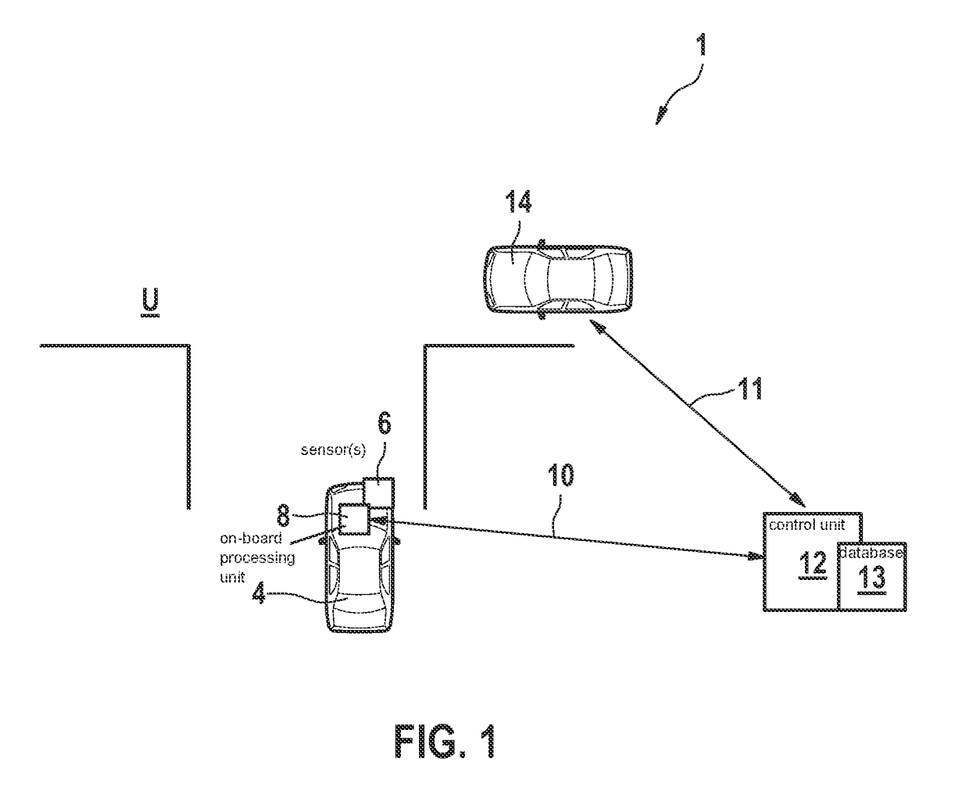
FIG. 1 schematically shows a representation of a vehicle arrangement for illustrating a method, in accordance with an example embodiment of the present invention.

FIG. 1 schematically shows a representation of a vehicle arrangement 1 for illustrating a method 2. Vehicle arrangement 1 includes one or multiple mapping vehicle(s) 4.

Mapping vehicles 4 may, for example, be passenger cars that are equipped with a sensor system for detecting the surroundings.

Mapping vehicles 4 include sensors 6 for collecting measured data of surroundings U.

Sensor 6 may be designed as a LIDAR sensor, a radar sensor, a camera sensor and the like.

The measured data may be collected by onboard processing units 8 and transmitted via a communication link 10 to a vehicle-external control unit 12.

Communication link 10 may, for example, be based on a transmission standard such as WLAN, UMTS, GSM, 4G, 5G and the like.

Control unit 12 is designed as a vehicle-external server unit and is able to receive the measured data of mapping vehicles 4 and to use them for creating digital maps.

Control unit 12 is able to create and certify the digital maps via multiple mapping steps, so that the digital maps are provided via a further communication link 11 to vehicles 14 or road users for implementing automated driving functions. During the creation of the digital map, the entire digital map or a part of the digital map is subdivided into map sections.

Control unit 12 in this case may provide the created digital map including the map sections to other road users 14. To keep the volume of data to be transmitted and to be processed by road user 14 low, the pieces of map information of the digital map are provided in the form of map sections that are geographically relevant for road user 14.

Figure 2:
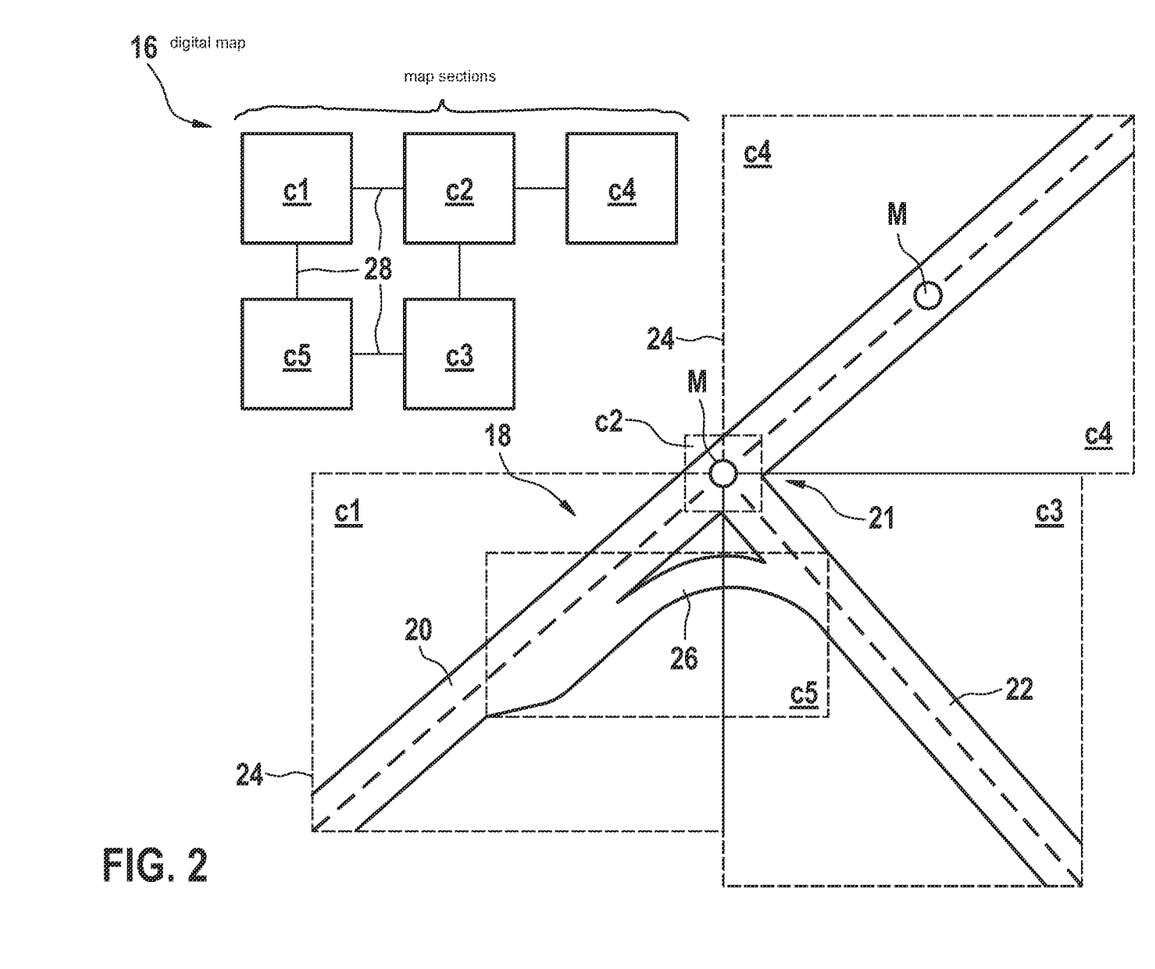
FIG. 2 schematically shows a representation of a digital map, in accordance with an example embodiment of the present invention.

FIG. 2 schematically shows a representation of a digital map 16, which is created and/or updated by control unit 12 by evaluating and processing measured data.

Digital map 16 includes a road course 18. Road course 18 is made up, for example, of a country road 20 and a junction or T-intersection 21 to a side road 22.

The area of digital map 16 along road course 18 is subdivided by multiple map sections c1 through c5. Map sections c in this case are situated in such a way that road course 18 is completely covered by preferably few map sections c. The number of divisions or borders 24 of map sections c is minimized in this case in order to avoid deviations and peripheral approximation errors.

In the exemplary embodiment depicted, road course 18 is mapped approximately through three large-area map sections c1, c3, c4. Further map sections c2, c5 are also formed, which contain details of junction 21 and an off-ramp 26 to side road 22 as pieces of map information.

Map sections c have different sizes and shapes in order to enable an optimal coverage of depicted road course 18.

In addition to the pieces of map information and the sections of road course 18, map sections c also include pieces of connection information 28 or connection data.

Pieces of connection information 28 show how road course 18 extends through respective map sections c. Pieces of connection information 28 describe, in particular, the extension of road course 18 beyond multiple map sections c. Map sections c in this case are partially or fully superposed.

Country road 20 of road course 18 extends from a first map section c1 across a second map section c2 into a fourth map section c4.

Side road 22, which is mapped by a third map section c3, may be accessed via junction 26 mapped by a fifth map section c5 or via T-intersection 21 or via second map section c2.

Figure 3:
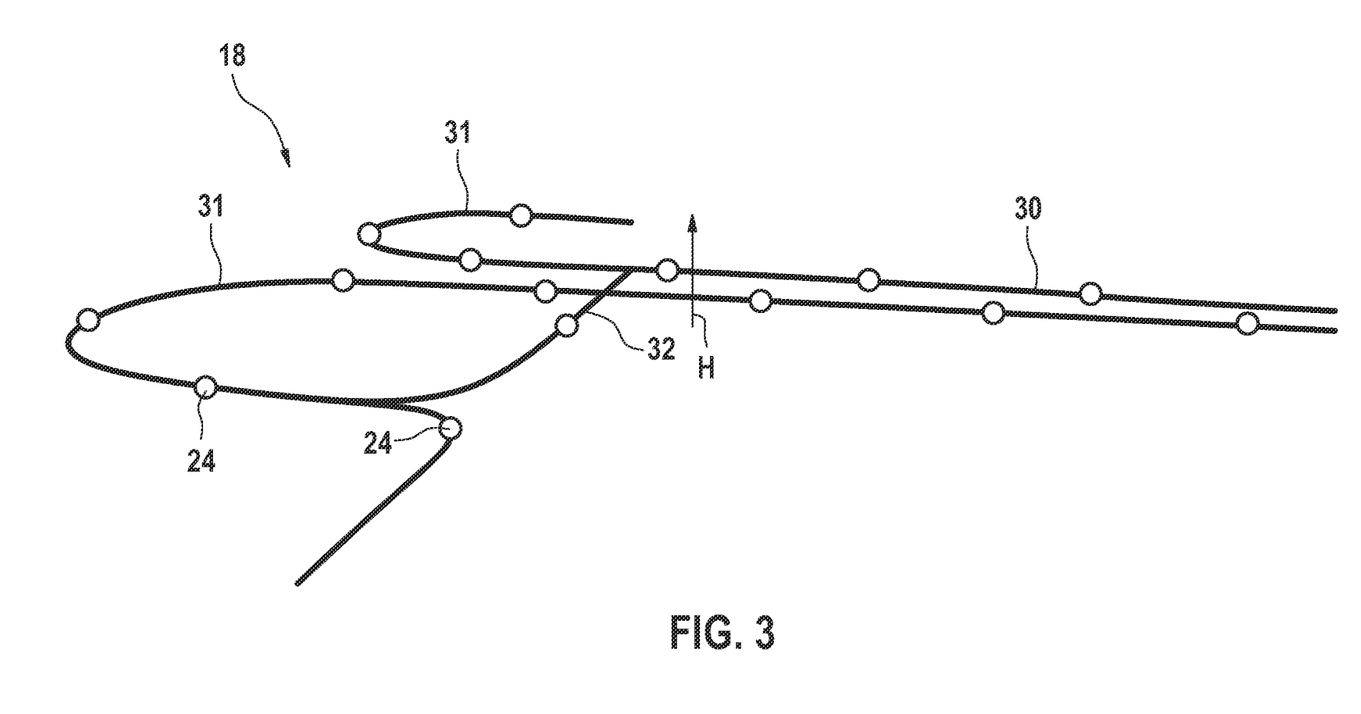
FIG. 3 shows a perspective representation of a road course for illustrating a creation of map sections, in accordance with an example embodiment of the present invention.

FIG. 3 shows a perspective representation of a road course 18 for illustrating a creation of map sections c. Borders 24 of created map sections c, which divide road course 18, are depicted as circles for the sake of clarity.

Road course 18 is depicted in a state subdivided by different map sections c in order to also illustrate a subdivision of road course 18 into multiple height levels H.

The subdivision of road course 18 by map sections c differs in this case as a function of the driving directions. Road course 18 is designed as highway 30 and includes two on-ramps and off-ramps 31. One on-ramp 31 is connected, for example, to an underpass 32, which extends below highway 30. Respective map sections c may be linked to one another by pieces of connection information 28 regardless of height level H.

An occurrence of ambiguities even in the superpositions of map sections c may be avoided by the use of pieces of connection information 28.

Figure 4:
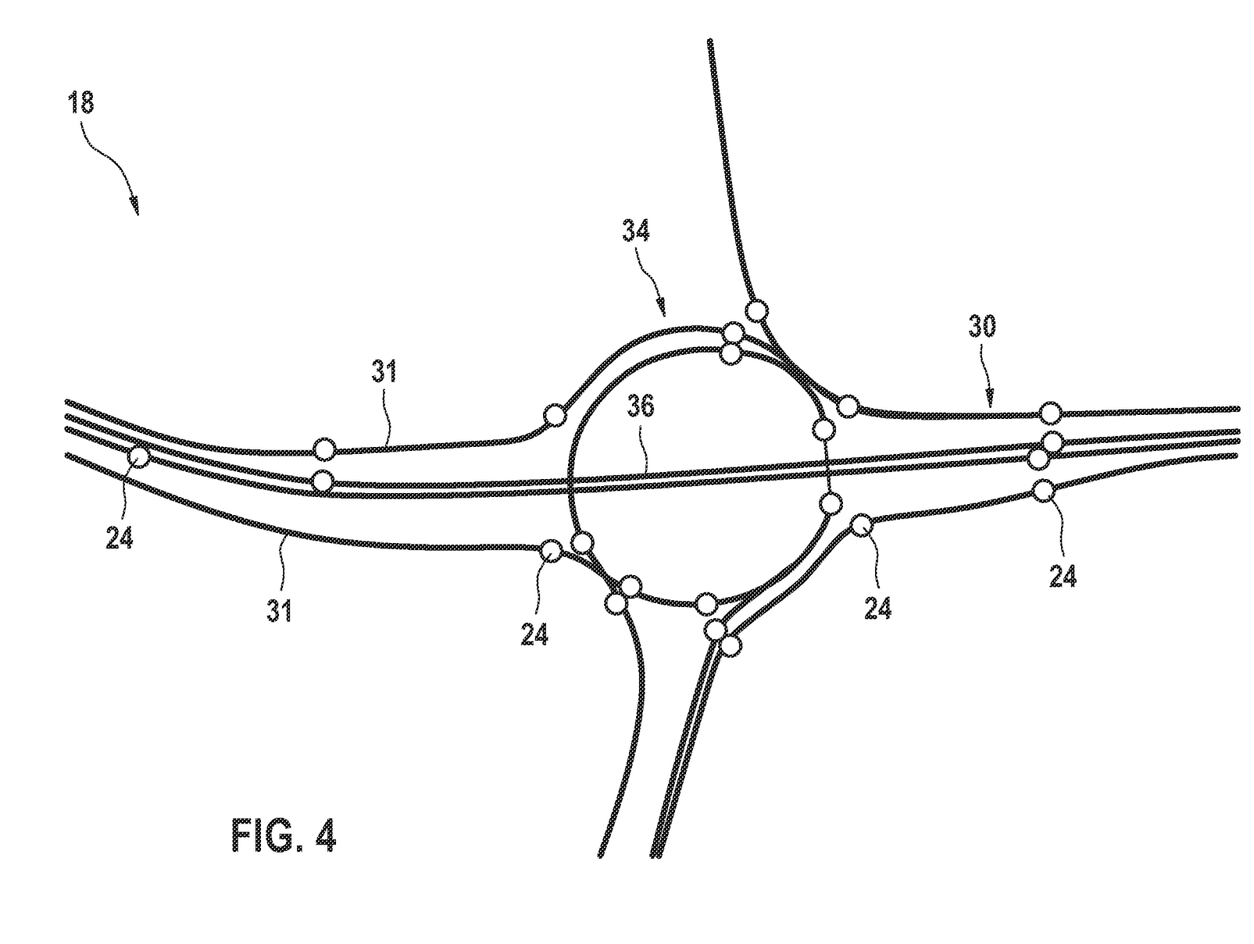
FIG. 4 shows a top view of a further road course for illustrating a creation of map sections, in accordance with an example embodiment of the present invention.

FIG. 4 shows a top view of a further road course 18 for illustrating a creation of map sections c. Road course 18 includes a highway 30, which empties via off-ramps 31 or on-ramps into a traffic circle 34. Traffic circle 34 is situated in height level H above highway 30. Highway 30 in this case runs through a tunnel 36 beneath traffic circle 34.

With the aid of an optimized size of map sections c, it is also possible to map in detail complex road courses 18, in particular, in urban areas and to enable a precise navigation based on created map sections c.

Figure 5:
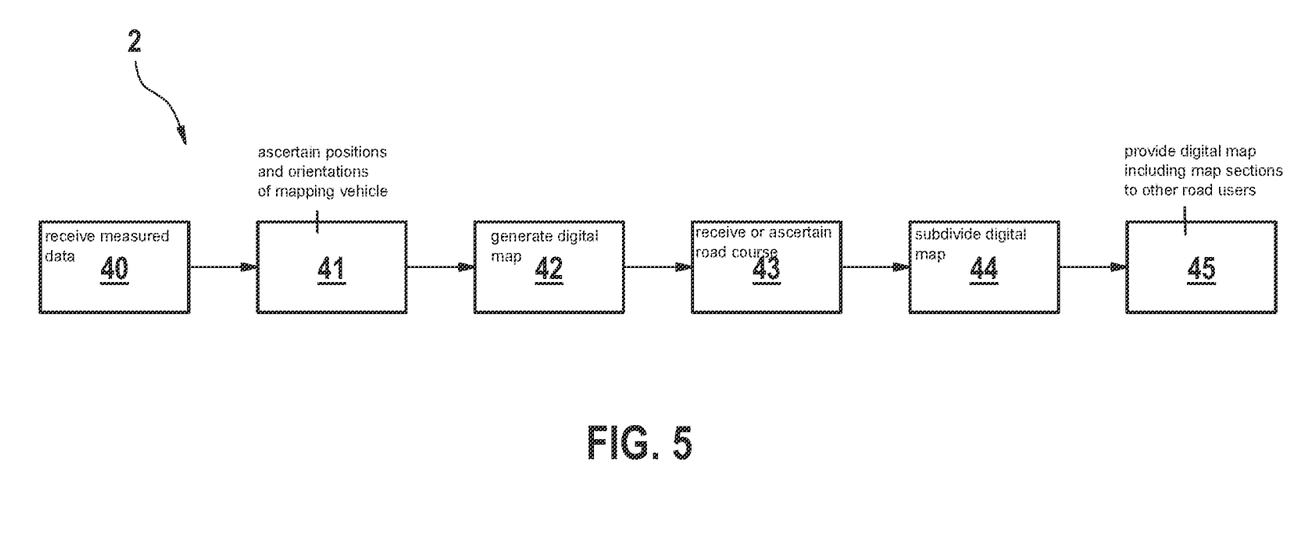
FIG. 5 schematically shows a flowchart for illustrating the method according to one specific embodiment, in accordance with an example embodiment of the present invention.

FIG. 5 schematically shows a flowchart for illustrating method 2 according to one specific embodiment. Method 2 is used for creating a digital map 16 and for subdividing digital map 16 into optimized map sections c. Method 2 and the following steps are carried out preferably by control unit 12.

In a step 40, measured data of at least one sensor 6 are received from at least one mapping vehicle 4.

Positions and orientations of mapping vehicle 4 are ascertained 41 via a SLAM method based on the received measured data.

Digital map 16 is generated in a further step 42 based on the received measured data, the positions and orientations of mapping vehicle 4.

In a further step 43, data of at least one road course 18 are received from a database 13 or ascertained from the positions of mapping vehicle 4. Database 13 may, for example, be a memory of control unit 12 or an external database 13.

Digital map 16 is subsequently subdivided 44 into at least two map sections c, which form at least one part of digital map 16. Map sections c are created along road course 18, pieces of connection information 28 related to one another being assigned by control unit 12 to map sections c, which correspond with road course 18.

In a final step 45, digital map 16 including map sections c and pieces of connection information 28 is provided to other road users 14 for navigation tasks and for implementing automated driving functions.

What is claimed is:

1. A method for creating a digital map, comprising the following steps:
   receiving, by a vehicle-external server, measured data of at least one sensor from at least one mapping vehicle, via a first wireless communication link;
   ascertaining, by the vehicle-external server, positions and orientations of the mapping vehicle via a SLAM method based on the received measured data;
   generating, by the vehicle-external server, the digital map based on the received measured data, and the ascertained positions and orientations of the mapping vehicle;
   receiving data of at least one road course from a database, or ascertaining the data of the at least one road course from the positions of the mapping vehicle;
   subdividing, by the vehicle-external server, the digital map into at least two map sections, which form at least one part of the digital map;
   wherein the map sections are created along the road course, each map section of the map sections including respective connection information stored in the map section, the respective connection information of the map sections being related to one another, and corresponding with the road course, the respective connection information of a first map section of the map sections including a link to at least one other map section of the map sections, the link providing information about how the road course extends beyond the first map section, and wherein the respective connection information of each map section of at least one of the map sections includes links to at least two other map sections of the map sections, the links being based on a junction of the road course, the junction of the road course being an intersection of two or more different roads;
   providing, by the vehicle-external server, the map sections and the respective connection information of the map sections, to a requesting vehicle, via a second wireless communication link; and
   performing, by the requesting vehicle, automated driving functions using the provided map sections.

2. The method as recited in claim 1, wherein the map sections are created having: (i) an equal or unequal shape, size, position within the digital map and/or (ii) an angle orientation relative to one another, and wherein the map sections are formed bordering one another and/or overlapping one another.

3. The method as recited in claim 1, wherein the map sections are created to include respective center points, the respective center point of at least one of the map sections being formed along the road course.

4. The method as recited in claim 1, wherein the map sections are created to include geographical coordinates, which define the borders of the map sections.

5. The method as recited in claim 1, wherein at least one trajectory and/or one width of the road course through each of at least one respective map section of the map sections is stored in the respective map section.

6. The method as recited in claim 1, wherein at least one driving direction and/or one lane count of the road course through each of at least one respective map section of the map sections is stored in the respective map section.

7. The method as recited in claim 1, wherein the pieces of connection information of each respective map section of the map sections is stored in the respective map section as a function of the road course and of at least one driving direction along the road course, at least one map section of the map sections being created as a function of a driving direction along the road course.

8. The method as recited in claim 1, wherein the at least two map sections of the map sections are created with stored pieces of meta-information.

9. A control unit configured to create a digital map by a control unit, the control unit configured to:
- receive, by a vehicle-external server, measured data of at least one sensor from at least one mapping vehicle, via a first wireless communication link;
- ascertain, by the vehicle-external server, positions and orientations of the mapping vehicle via a SLAM method based on the received measured data;
- generate, by the vehicle-external server, the digital map based on the received measured data, and the ascertained positions and orientations of the mapping vehicle;
- receive data of at least one road course from a database, or ascertain the data of the at least one road course from the positions of the mapping vehicle; and
- subdivide, by the vehicle-external server, the digital map into at least two map sections, which form at least one part of the digital map;
- wherein the map sections are created along the road course, each map section of the map sections including respective connection information stored in the map section, the respective connection information of the map sections being related to one another, and corresponding with the road course, the respective connection information of a first map section of the map sections including a link to at least one other map section of the map sections, the link providing information about how the road course extends beyond the first map section, and wherein the respective connection information of each map section of at least one of the map sections includes links to at least two other map sections of the map sections, the links being based on a junction of the road course, the junction of the road course being an intersection of two or more different roads; and
- provide, by the vehicle-external server, the map sections and the respective connection information of the map sections, to a requesting vehicle, via a second wireless communication link;
- wherein the requesting vehicle performs automated driving functions using the provided map sections.

10. A non-transitory machine-readable memory medium on which is stored a computer program for creating a digital map by a control unit, the computer program, when executed by a computer or control unit, causing the computer or the control unit to perform the following steps:
- receiving, by a vehicle-external server, measured data of at least one sensor from at least one mapping vehicle, via a first wireless communication link;
- ascertaining, by the vehicle-external server, positions and orientations of the mapping vehicle via a SLAM method based on the received measured data;
- generating, by the vehicle-external server, the digital map based on the received measured data, and the ascertained positions and orientations of the mapping vehicle;
- receiving data of at least one road course from a database, or ascertaining the data of the at least one road course from the positions of the mapping vehicle;
- subdividing, by the vehicle-external server, the digital map into at least two map sections, which form at least one part of the digital map;
- wherein the map sections are created along the road course, each map section of the map sections including respective connection information stored in the map section, the respective connection information of the map sections being related to one another, and corresponding with the road course, the respective connection information of a first map section of the map sections including a link to at least one other map section of the map sections, the link providing information about how the road course extends beyond the first map section, and wherein the respective connection information of each map section of at least one of the map sections includes links to at least two other map sections of the map sections, the links being based on a junction of the road course, the junction of the road course being an intersection of two or more different roads;
- providing, by the vehicle-external server, the map sections and the respective connection information of the map sections, to a requesting vehicle, via a second wireless communication link; and
- performing, by the requesting vehicle, automated driving functions using the provided map sections.

11. The method as recited in claim 1, wherein the junction is a T-intersection of the road course.

12. The control unit as recited in claim 9, wherein the junction is a T-intersection of the road course.

13. The non-transitory machine-readable memory medium as recited in claim 10, wherein the junction is a T-intersection of the road course.

\* \* \* \* \*